United States Patent
Hagg et al.

(10) Patent No.: US 7,712,144 B2
(45) Date of Patent: May 4, 2010

(54) SECURE DEVICE FOR SHARING COPY PROTECTION IDENTIFICATION INFORMATION, A RENDERING DEVICE FOR EXECUTING COPY PROTECTED CONTENT BASED ON THE IDENTIFICATION INFORMATION, AND CORRESPONDING METHODS

(75) Inventors: Wilhelm Hagg, Korb (DE); Arnd Krusche, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1176 days.

(21) Appl. No.: 11/285,055

(22) Filed: Nov. 22, 2005

(65) Prior Publication Data

US 2006/0130153 A1 Jun. 15, 2006

(30) Foreign Application Priority Data

Nov. 24, 2004 (EP) .................................. 04027899

(51) Int. Cl.
*H04N 7/16* (2006.01)
(52) U.S. Cl. ...................................................... 726/29
(58) Field of Classification Search .................... 726/29
See application file for complete search history.

(56) References Cited

U.S. PATENT DOCUMENTS 6,182,229 B1    1/2001  Nielsen
7,421,411 B2 *  9/2008  Kontio et al. ................. 705/52
2003/0079133 A1 * 4/2003  Breiter et al. ................ 713/182
2004/0093523 A1 * 5/2004  Matsuzaki et al. ........... 713/201

FOREIGN PATENT DOCUMENTS

EP       0 930 556        7/1999
WO       WO 03/094476     11/2003

* cited by examiner

*Primary Examiner*—Kambiz Zand
*Assistant Examiner*—Aubrey H Wyszynski
(74) *Attorney, Agent, or Firm*—Oblon, Spivak, McClelland, Maier & Neustadt, L.L.P.

(57) ABSTRACT

The present invention relates to a secure device for copy protection comprising an ID database (3) for storing identification numbers IDs for decrypting copy protected encrypted content, a transceiving means (5,2) for transmitting and/or receiving IDs to and/or from an external device via a short range transmission system and an ID handler (4) for controlling the transmission and reception of the IDs in accordance with predefined transmission and/or reception rights.

Figure 1:
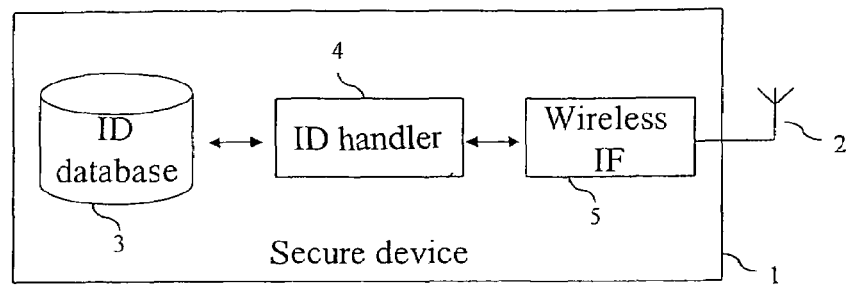

The present invention further relates to a rendering device for executing copy protected content comprising a data source (18,19,20) for providing copy protected encrypted content, a receiving means (5,2) for receiving IDs for decrypting the encrypted content from a secure device (1) via a short range transmission system and a controller (11) for assigning to every copy protected encrypted content the respective ID for decrypting said content in order to execute the decrypted content.

The present invention in addition relates to a method for copy protection and to a method for executing copy protected content.

15 Claims, 2 Drawing Sheets

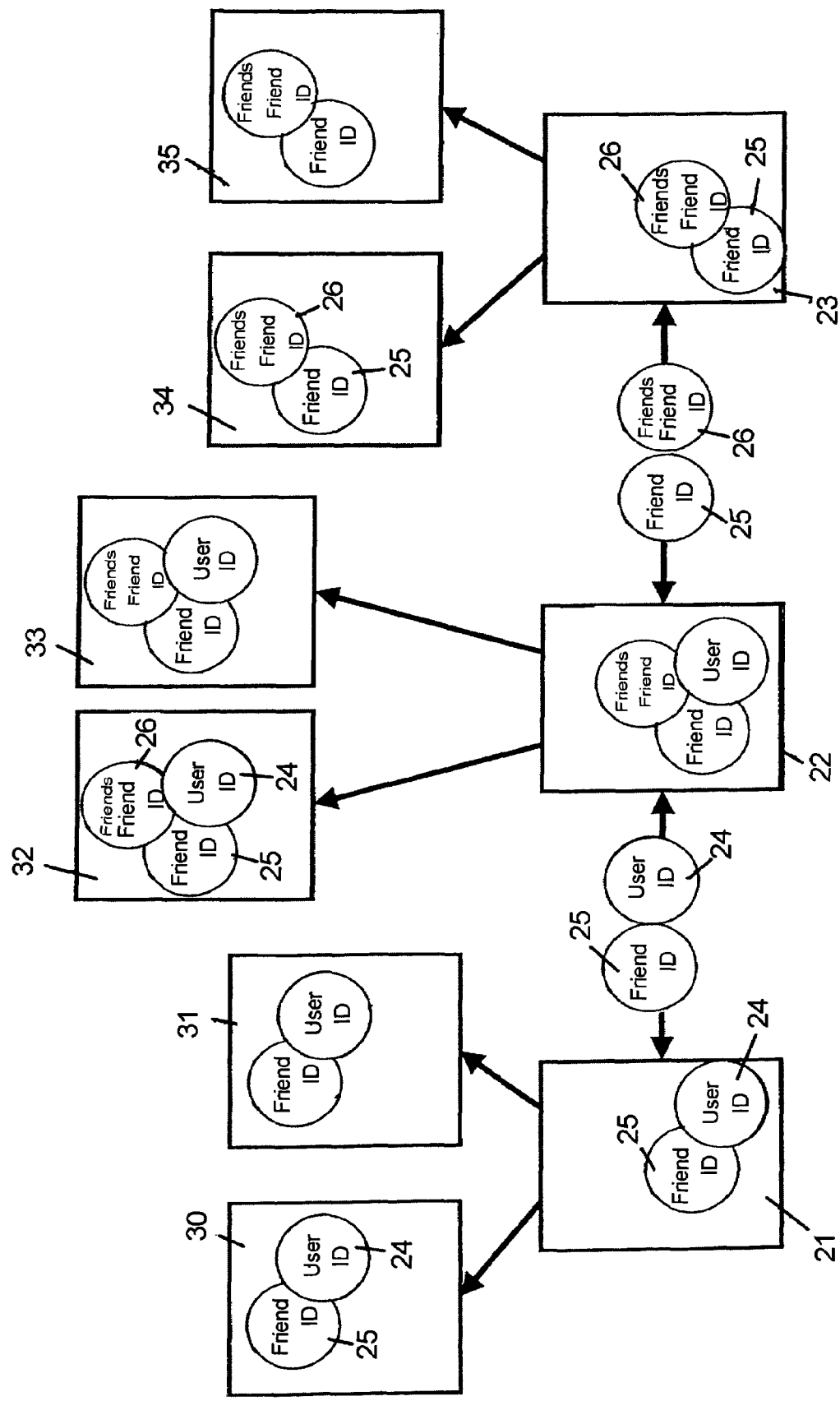

SECURE DEVICE FOR SHARING COPY PROTECTION IDENTIFICATION INFORMATION, A RENDERING DEVICE FOR EXECUTING COPY PROTECTED CONTENT BASED ON THE IDENTIFICATION INFORMATION, AND CORRESPONDING METHODS

The present invention relates to a secure device for copy protection and to a rendering device for executing copy protected content. The present invention further relates to a method for copy protection on a secure device and to a method for executing copy protected content on a rendering device.

Digital technology not only allows to digitise content such as still images, audio and films but also to make perfect copies of content once it is digitised. Digital content can be copied perfectly, allowing an unlimited number of copy generations. While this is convenient for content consumers, it poses various problems for content producers and results in an extraordinary monetary damage both for the owner of the respective intellectual property and for the re-sellers and support providers.

Therefore, the providers of digital data are searching for solutions to prevent the manufacture and distribution of illegally copied digital data.

Most of the prior art addresses the problem of copying by transforming the digital contents into an illegible form, e.g. by scrambling or encrypting it using cryptographic techniques. Consumption of content is now only possible with additional knowledge and/or techniques, e.g. a decryption key or an unscrambling algorithm. Merely copying contents is still possible, but no longer sufficient for the consumption of the contents. Such methods are commonly referred to as digital right management (DRM).

Replaying DRM-protected content on computers usually requires the installation of appropriate DRM software. This, however, may be problematic when legitimate owners of digital content want to move their collections of content, and with it the necessary DRM system components to a new location, e.g. a newly bought computer or from home to the car stereo system or the like.

It is therefore an object of the present invention to provide a system for copy protection and for executing copy protected content which avoids large-scale copy right infringements but at the same time does not restrict the consumer too much and gives the consumer the freedom to make some private copies.

The above-mentioned object is achieved by a secure device for copy protection according to claim 1.

The secure device for copy protection according to the present invention comprises an ID database for storing identification numbers IDs for decrypting copy protected encrypted content, a transceiving means for transmitting and/or receiving IDs to and/or from an external device via a short range transmission system and an ID handler for controlling the transmission and reception of the IDs in accordance with predefined transmission and/or reception rights.

The above-mentioned object is further achieved by a rendering device for executing copy protected content according to claim 12.

The rendering device for executing copy protected content according to the present invention comprises a data source for providing copy protected encrypted content, a receiving means for receiving IDs for decrypting the encrypted content from a secure device via a short range transmission system and a controller for assigning to every copy protected encrypted content the respective ID for decrypting said content in order to execute the decrypted content.

The above-mentioned object is further achieved by a method for copy protection on a secure device according to claim 17.

The method for copy protection on a secure device according to the present invention comprises the steps of storing identification numbers IDs for decrypting copy protected encrypted content in an ID database, transmitting and/or receiving IDs to and/or from an external device via a short range transmission system and controlling the transmission and reception of the IDs in accordance with predefined transmission and/or reception rights.

In addition, the above-mentioned object is achieved by a method for executing copy protected content on a rendering device according to claim 26.

The method for executing copy protected content on a rendering device according to the present invention comprises the steps of providing copy protected encrypted content, receiving IDs for decrypting the encrypted content from a secure device via a short range transmission system and assigning to every copy protected encrypted content the respective ID for decrypting said content in order to execute the decrypted content.

The present invention, therefore, enables the execution of copy protected content if the respective ID for decrypting said content is available. Further, by providing the possibility of transmitting and/or receiving IDs to and/or from other devices and at the same time by controlling the transmission and reception of the IDs by an ID handler, the exchange of IDs can be restricted to a level, which avoids large-scale copy right infringements but at the same time lets the user the right to copy the IDs for private use.

Preferably, the transceiving means transmits the IDs stored in the ID database to a rendering device for decrypting copy protected encrypted content with the respective ID.

Further preferably, the IDs stored in the ID database are assigned to different persons.

In a preferred embodiment in the ID database together with every ID the respective assignment information is stored.

Advantageously, at least one ID stored in the ID database is assigned to the user of the secure device.

Further advantageously, the ID handler permits transmission of the at least one ID assigned to the user of the secure device to a second secure device.

Preferably, the ID handler prevents transmission of IDs assigned to persons other than the user of the secure device to a second secure device.

Further preferably, in the ID database together with every ID the time of transmission and/or reception is stored.

Advantageously, every ID assigned to a person other than the user of the secure device is deleted from the ID database after a predetermined time.

The short range transmission system can be a Bluetooth or an IR transmission system.

Figure 2:
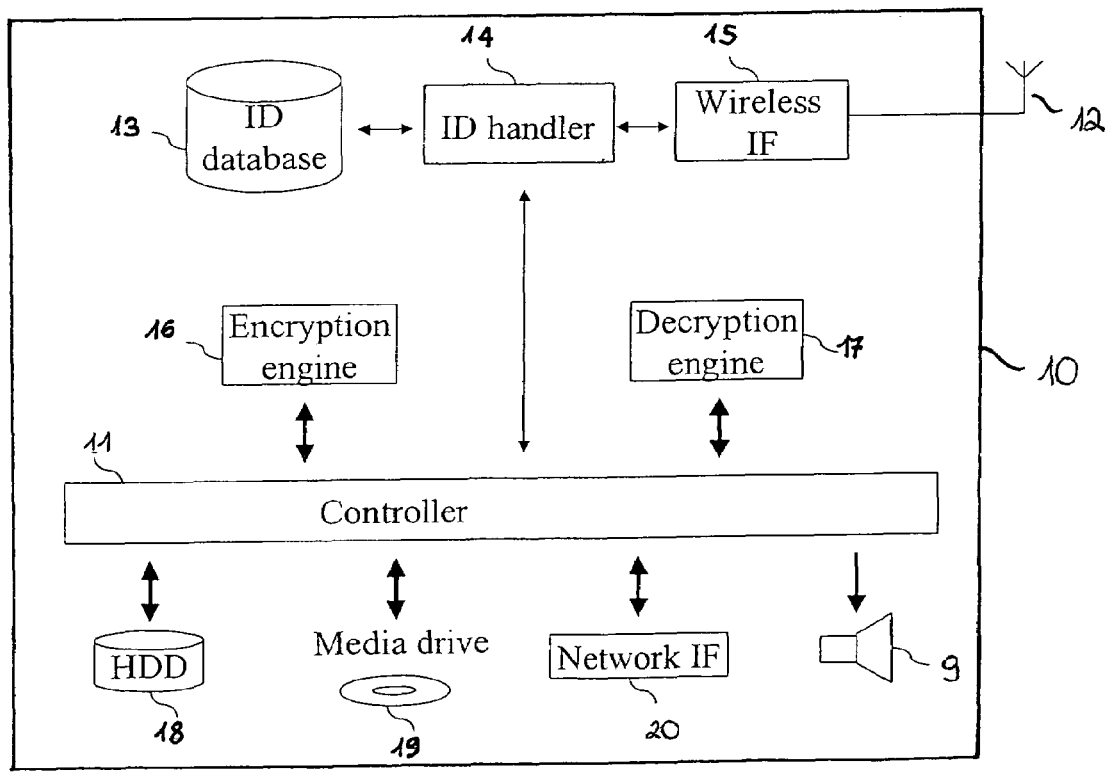

Embodiments of the invention will now be described, by way of example only, with reference to the accompanying drawings in which:

FIG. 1 is a block diagram showing schematically the elements of the secure device according to the present invention, FIG. 2 is a block diagram showing schematically the elements of the rendering device according to the present invention and FIG. 3 is a block diagram showing schematically the system for exchanging IDs according to the present invention.

FIG. 3 shows schematically the system according to the present invention for exchanging IDs in order to provide copy protection. Hereby, a user has a unique user ID 24 which serves for decrypting copy protected encrypted content. This user ID 24 is stored on a personal secure device 21, which may be for example a mobile phone or any personal device used for general identification purposes like digital passports, digital door openers and so on. Also devices for storing personal preference profiles, e.g. for seat and mirror positioning in cars and audio video settings could be used as a personal secure device. Of course any combination of the above-mentioned devices is possible.

The user ID 24 can be transferred from the user secure device 21 to a second secure device or to a rendering device. The transmission of the user ID 24 thereby is executed wirelessly, e.g. via Bluetooth, infrared or the like, but also other transmission mechanisms via cable or the like are possible. In any case, the device to which the user ID 24 is transmitted, has to be nearby the user secure device 21 so that a short range transmission can be accomplished. A transmission over long distance means such as internet, wireless communication or the like is not allowed.

The user secure device 21 serves for providing the user ID 24 to the user rendering devices 30, 31. The user rendering devices 30, 31 are able to execute the copy protected content. Hereby, as the content is encrypted with a specific key, a decryption and execution of the content by the rendering device is only possible if the respective user ID 24 is present. According to the present invention, there are two possibilities for providing the user ID 24 to the user rendering devices 30, 31 in order to decrypt the copy protected content. A first possibility is to transmit the user ID 24 from the user secure device 21 to the user rendering devices 30, 31, whereby the user ID 24 is then stored in the user rendering devices 30, 31, so that the copy protected content can be decrypted and executed by using the stored user ID 24 even when the user secure device 21 is not nearby. In a second possibility the user ID 24 is not stored on the user rendering devices 30, 31. For decrypting and executing the copy protected content the user secure device 21 has to be in reach of the user rendering devices 30, 31, so that the user rendering devices can access the user ID 24 stored in the user secure device 21.

In an analogues way to the system explained above a friend of the user possesses a friend secure device 22 on which a friend ID 25 is stored which is then provided to friend rendering devices 32, 33 in order to decrypt copy protected encrypted content. In the same way, a friend's friend ID 26 stored on a friend's friend secure device 23 is provided to friend's friend rendering devices 34, 35 for the decryption and execution of copy protected content by the friend's friend rendering devices 34, 35.

According to the present invention, the copy protected encrypted content can be transmitted freely to any other device and underlies no distribution restrictions. Executing the encrypted content hereby is only possible if the respective ID is available. Therefore, according to the present invention, the copy protection is accomplished by restricting the copying of the IDs needed for decrypting the copy protected content.

If the user and a friend meet and the user has his user secure device 21 with him and the friend has his friend secure device 22 nearby, then the respective IDs can be exchanged between the secure devices. That means that the user transfers his user ID 24 from his user secure device 21 to the friend's secure device 22 and the friend transfers his friend ID 25 from the friend's secure device 22 to the user secure device 21. Therewith the user then is able to execute copy protected content that has to be decrypted with the friend ID 25 and the friend is able to execute copy protected content that has to be decrypted with the user ID 24. In an analogous way the friend and a friend's friend can exchange their respective IDs, i.e. the friend transmits his friend ID 25 to the friend's friend secure device 23 and the friend's friend transmits his friend's friend ID 26 from the friend's friend secure device 23 to the friend's secure device 22.

In order to avoid large-scale copying of the IDs, the present invention provides several types of transmission restrictions. A first possibility is to allow a person to only transmit his own ID to other secure devices but not to transmit IDs the person has received from other secure devices. With reference to FIG. 3 this means that the friend cannot transmit the user ID 24 to the friend's friend secure device 23, and he cannot transmit the friend's friend ID 26 to the user secure device 21. So the user is not able to execute copy protected content which has to be decrypted with the friend's friend ID 26 and the friend's friend cannot execute copy protected content which has to be decrypted with the user ID 24 unless the user and the friend's friend meet personally. With this mechanism it is assured that a person has the freedom to share copy protected content with friends but at the same time large scale copying is prevented.

A further possibility is to store not only the ID but also to store the information when the ID was transmitted. That means that when the user transfers his user ID 24 to the friend's secure device 22 then together with the user ID 24 the date and time of the transmission is stored. If the user and the friend meet again then this date and time information is updated. Otherwise, if the user and the friend do not meet regularly or any more, then the user ID 24 on the friend's secure device 22 expires and is deleted. The same can be applied for IDs stored on the rendering devices. If for example the user has transmitted his user ID 24 to a first rendering device 30 and does not use his user ID 24 on the rendering device 30 often, then also the user ID 24 may expire on that device.

Another possibility is to identify persons that meet very frequently, e.g. family members. Those family members then may be allowed to exchange not only their personal IDs but also all the IDs they have received from friends. This enables all family members to execute the content one family member is allowed to execute. In order to avoid a chain reaction, only those IDs may be exchanged between family members that are directly picked up from other secure devices. Those friend IDs that result from a exchange between family members may not be forwarded to other family members.

Furthermore, users are able to limit the transferability of their IDs to certain other people voluntarily in order to protect certain content.

With reference to FIG. 1 in the following the components of a secure device 1 according to the present invention will be explained. The secure device 1 comprises a wireless interface 5 together with an antenna 2 that is used for receiving and transmitting IDs from and to other secure devices as well as to transmit IDs to rendering devices via a short range transmission system. In an ID data base 3 all incoming IDs as well as the IDs of the friends are stored permanently. Hereby, the IDs of family members may be stored in a separate category.

As already explained above, the IDs stored in the ID database 3 either are assigned to the user of the secure device 1 or are assigned to friends of the user of the secure device. Therefore, in order to handle transmission rights of the stored IDs, together with every ID the respective assignment information are stored. Further, along with each ID the contact times and the contact frequency are stored in order to determine which ID is further stored and which ID is expired. An ID handler 4 is responsible for picking up the IDs from the wireless interface 5 and for storing them in the ID data base 3. Furthermore, the ID handler 4 has to broadcast the own ID via the wireless interface 5 that is connected to the antenna 2. From all data available in the data base the ID handler has to generate a list of trusted friends and/or family members and transmit it to the rendering devices via the wireless interfaces 5. The rendering devices will then be authorized to playback and execute content originating from anyone of the friends.

The secure device 1 may be either a stand-alone device like a key or a card or a combined device providing additional functionalities. For example, the components required for a secure device may be implemented in a mobile phone, so that the phone can be used as secure device.

With reference to FIG. 2 the components of a rendering device will be explained. The rendering device as the secure device 1 contains an ID data base 13 for the storage of the IDs together with the contact times and contact frequency, an ID handler 4 for controlling the transmission, reception and storage of the IDs, a wireless interface 15 together with an antenna 12 for transmitting and receiving IDs. The ID handler 14 stores all IDs it receives via the wireless interface 15 in the ID data base 13. In order to limit the number of friends, those IDs that are not frequently received by the rendering device 10 may be deleted after a certain time.

All data flow on the rendering device 10 is controlled by a data handler 11. Possible sources of data are local storage media such as hard disc drives 18, media drives for removable media as CD, DVD, memory stick and the like 19 and network interfaces 20 that provide connection to the internet or to local networks. All this data sources may also act as a data sink. Furthermore, the rendering device 10 itself as a speaker 9 or a display may act as a data sink.

Unprotected content may be transferred without restrictions between this data source and sink instances. Protected content from the network or removable media need to be accessed by a corresponding copy protection system. Different implementations of such a content protection system may be used on the rendering device. For network based distribution currently Windows Media DRM, Fairplay, Harmony and Open Magic Gate are used for copy protection. In addition, different copy protection mechanisms are used on audio CDs as well as DVDs.

Unless the copy protection system prohibits the playback of protected content, it is allowed to be streamed to the local rendering devices and the speaker. Depending on the device design it may also be stored permanently on a hard disc drive. Basically this depends on whether the hard disc is accessible only by the data handler 11 or also by other applications on the device. However, protected content is not allowed to be copied to a removable storage medium or to the network directly. In order to distribute the content via this channels, it need to be encrypted by the encryption engine 16 by using the ID provided by a personal secure device 1 that is accessible during the copy request. After encryption the content may be distributed freely via any channel, since the ID of the person doing the copy is required for playback.

The decryption engine 17 is used for the decryption of content that was encrypted by another device. The ID that was used for encryption is required for the decryption operation. If the required ID is not available in the ID data base 13, the decryption of the content is denied. If the content originates from a friend and a valid ID is available in the ID data base 13, it may be encrypted and is allowed to be executed on the rendering device 10. Furthermore, it may be allowed to be stored permanently on a hard disc drive. In contrast to this, it is not allowed to copy the content from a friend to a removable media or to the network by encrypting it again with the own ID. This guarantees that the access to the content remains limited to the friends and is not granted to friends of a friend.

As a result, the execution of such encrypted content may be distributed on the internet but playback is only possible for the owner as well as his friends. Thus, the owner of the content does not have any restrictions in copying and execution. Even his friends may execute the content. This will increase the acceptance of the content protection a lot. Furthermore, the distribution of entertainment content such as music to friends is kind of advertisement that could generate additional revenue. If the friend then likes the received content, he will buy a regular copy, so that he can provide his favorite contents to his friends and so on.

The invention claimed is:

1. A secure device for copy protection, comprising:
    an ID database that stores identification number IDs for decrypting copy protected encrypted content, wherein each ID is assigned to a different person and, together with each ID, information of an assignment to a specific person is stored in the ID database;
    a transceiving means for transmitting and/or receiving IDs to and/or from an external device via a short range transmission system; and
    an ID handler that controls the transmission and reception of the IDs in accordance with predefined transmission and/or reception rights, wherein
    the ID handler is configured to store a received ID in the ID database and to transmit an ID stored in the ID database via the transceiving means,
    at least one ID stored in the ID database is assigned to a user of the secure device, and
    the ID handler permits transmission of the at least one ID assigned to the user of the secure device to a second secure device of a second user.

2. The secure device according to claim 1, wherein the transceiving means transmits the IDs stored in the ID database to a rendering device for decrypting copy protected encrypted content with a respective ID.

3. The secure device according to claim 1, wherein the ID handler prevents transmission of IDs assigned to persons other than the user of the secure device to the second secure device.

4. The secure device according to claim 1, wherein in the ID database stores, together with every ID, a time of transmission and/or reception.

5. The secure device according claim 4, wherein every ID assigned to a person other than the user of the secure device is deleted from the ID database after a predetermined time.

6. The secure device according to claim 1, wherein the short range transmission system is a Bluetooth or an IR transmission system.

7. A mobile terminal for wireless communication system comprising a secure device according to claim 1.

8. A rendering device for executing copy protected content, comprising:
    a data source that provides copy protected encrypted content;
    a receiving means for receiving IDs that decrypt the encrypted content from a secure device via a short range transmission system;
    an ID database that stores the received IDs; and
    a controller that assigns to every copy protected encrypted content a respective ID that decrypts said content in order to execute the decrypted content, wherein
    the ID database stores, together with every ID, a time of reception; and every ID is deleted from the ID database after a predetermined time after the reception of the ID.

9. The rendering device according to claim 8, wherein the short range transmission system is a Bluetooth or an IR transmission system.

10. A method for copy protection on a secure device, comprising:
storing identification number IDs for decrypting copy protected encrypted content in an ID database, wherein each ID is assigned to a different person and at least one ID stored in the ID database is assigned to a user of the secure device;
storing in the ID database, together with each ID, information of an assignment to a specific person;
transmitting and/or receiving IDs to and/or from an external device via a short range transmission system, wherein the received IDs are stored in the ID database and the IDs stored in the ID database are transmitted;
controlling the transmission and reception of the IDs in accordance with predefined transmission and/or reception rights; and
permitting the transmission of the at least one ID assigned to the user of the secure device to a second secure device of a second user.

11. The method for copy protection according to claim 10, further comprising:
transmitting the IDs stored in the ID database to a rendering device for decrypting copy protected encrypted content with a respective ID.

12. The method for copy protection according to claim 10, further comprising:
preventing the transmission of IDs assigned to persons other than the user of the secure device to the second secure device.

13. The method for copy protection according to claim 10, further comprising:
storing in the ID database, together with every ID, a time of transmission and/or reception.

14. The method for copy protection according claim 13, further comprising:
deleting every ID assigned to a person other than the user of the secure device from the ID database after a predetermined time.

15. A method for executing copy protected content on a rendering device, comprising:
providing copy protected encrypted content;
receiving IDs that decrypt the encrypted content from a secure device via a short range transmission system;
storing the received IDs in an ID database;
assigning to every copy protected encrypted content a respective ID that decrypts said content in order to execute the decrypted content;
storing in the ID database, together with every ID, a time of reception; and
deleting every ID from the ID database after a predetermined time after the reception of the ID.

* * * * *